United States Patent [19]

Kaneda et al.

[11] Patent Number: 5,385,312
[45] Date of Patent: Jan. 31, 1995

[54] TAPE CASSETTE

[75] Inventors: Hiroshi Kaneda, Saku; Masatoshi Okamura; Hisao Katoh, all of Saku, Japan

[73] Assignee: TDK Corporation, Tokyo, Japan

[21] Appl. No.: 77,442

[22] Filed: Jun. 17, 1993

[30] Foreign Application Priority Data

Jun. 26, 1992 [JP] Japan ............................. 4-051008[U]

[51] Int. Cl.⁶ ............................................. B32B 31/16
[52] U.S. Cl. ................................................... 242/347
[58] Field of Search ............... 242/197, 198, 199, 347; 360/132; 156/73.1, 580.2

[56] References Cited

U.S. PATENT DOCUMENTS

| 3,910,692 | 10/1975 | Scibilia | 352/130 |
| 5,201,476 | 4/1993 | Gelardi et al. | 242/199 |
| 5,288,350 | 2/1994 | Kita | 156/73.1 |

FOREIGN PATENT DOCUMENTS

| 64-52178 | 3/1989 | Japan . |
| 164169 | 4/1989 | Japan . |
| 171371 | 5/1989 | Japan . |
| 1159277 | 11/1989 | Japan . |
| 2210352 | 6/1989 | United Kingdom . |

Primary Examiner—Daniel P. Stodola
Assistant Examiner—John P. Darling
Attorney, Agent, or Firm—Oblon, Spivak, McClelland, Maier & Neustadt

[57] ABSTRACT

A tape cassette comprising a casing for housing a tape-like medium, which is made of synthetic resin; the casing including an upper half casing and a lower half casing, which are connected together at connecting portions as one unit; a cylindrical projection which is formed on either one of the upper half casing and the lower half casing, and which has a hollow recess and a receiving recess formed therein to be apart from each other by a partition wall; a pole-like boss which is formed on the other half casing to project therefrom, and which has an engagement rib and a supporting rib, the engaging rib being adapted to be inserted into the receiving recess of the cylindrical projection, and the supporting rib being adapted to support an abutting surface of the cylindrical projection; the supporting rib having an abutting surface formed thereon to receive the abutting surface of the cylindrical projection and to form a gap between melt-bonding surfaces of the cylindrical projection and the pole-like boss when the engagement rib of the pole-like boss is inserted into the receiving recess of the cylindrical projection during assemblage; and both melt-bonding surfaces being spot-melt-bonded as one unit by inserting a melt-bonding horn from the hollow recess.

2 Claims, 3 Drawing Sheets

TAPE CASSETTE

The present invention relates to a tape cassette, such as a videocassette or a digital audiotape (DAT) wherein a recording medium, e.g. a tape-like medium, is housed in a casing.

In general, an information medium for a videocassette is housed in a synthetic resin casing to be protected because it is likely to capture dirt or dust in use and to be damaged. The casing is prepared by making an upper half casing and a lower half casing of ABS resin (acrylonitrile butadiene styrene copolymer resin), PS resin (polystyrene resin) or PC resin (polycarbonate resin), and melt-bonding both casings at their melt-bonding portions.

As shown in FIG. 6, a conventional videocassette has such a structure that an upper half casing a and a lower half casing b have melt-bonding projections c formed thereon, respectively, mating surfaces of the melt-bonding projections or the outer peripheral walls of one of the casings are provided with melt-bonding ribs d, and a melt-bonding horn e is used to connect both casings as one unit. Strong energy is required to melt crystalline resin during melt-bonding. When the melt-bonding ribs are long and great, the time required for melt-bonding is prolonged, and the relationship between the mating surfaces and the melt-bonding ribs sometimes creates difficulty in melt bonding. Melt-bonding the melt-bonding ribs has a small resistance to shear stress applied to the upper or lower half casings, and there is a possibility that the upper and lower half casings separate from each other due to torsion or drop shock applied to the half casings. In order to improve the melt-bonding strength, the number of the melt-bonding ribs have to increase. This means that it is necessary to melt-bond a wide area to increase the melt-bonding strength, increasing problems in that a surface of the half casings is melt to have bad appearance to lower the market value and to be unreliable.

It is an object of the present invention to eliminate the problems of the conventional tape cassette, and to provide a tape cassette having a simple structure inexpensively, which is capable of easy melt-bonding even if an upper and a lower half casing are made of crystalline resin, or regardless of how thick the half casings are, improving the melt-bonding strength to connect the upper and lower half casings firmly, and withstanding torsion or drop shock applied to the half casings, and which is safe and highly reliable and has good appearance.

The foregoing and other objects of the present invention have been attained by providing a tape cassette comprising a casing for housing a tape-like medium, which is made of synthetic resin; the casing including an upper half casing and a lower half casing, which are connected together at connecting portions as one unit; a cylindrical projection which is formed on either one of the upper half casing and the lower half casing, and which has a hollow recess and a receiving recess formed therein to be apart from each other by a partition wall; a pole-like boss which is formed on the other half casing to project therefrom, and which has an engagement rib and a supporting rib, the engaging rib being adapted to be inserted into the receiving recess of the cylindrical projection, and the supporting rib being adapted to support an abutting surface of the cylindrical projection; the supporting rib having an abutting surface formed thereon to receive the abutting surface of the cylindrical projection and to form a gap between melt-bonding surfaces of the cylindrical projection and the pole-like boss when the engagement rib of the pole-like boss is inserted into the receiving recess of the cylindrical projection during assemblage; and both melt-bonding surfaces being spot-melt-bonded as one unit by inserting a melt-bonding horn from the hollow recess.

It is preferable that the total area of the abutting surface of the supporting rib is at least the same as the area of the melt-bonding surface of the pole-like boss.

It is preferable that the supporting rib and the engagement rib are formed on an outer periphery of the pole-like boss to radially project therefrom.

In accordance with the present invention, when the upper and lower half casings are matched before melt-bonding both half casings as one unit by use of a melt-bonding horn, the pole-like boss on one of the half casings, e.g. the upper half casing, and the hollow cylindrical projection on the other half casing, e.g. the lower casing are butted together, and the presence of the supporting rib forms the gap between the melt-bonding surfaces. The horn is inserted into the hollow recess of the hollow cylindrical projection to spot-melt-weld the melt-bonding surfaces of the hole-like boss and the hollow cylindrical projection, thereby connecting the melt-bonding surfaces as one unit by intermolecular bond. As a result, the connection of both half casings is made firm to withstand shear stress applied to the half casings in a longitudinal direction and a transverse direction, and melt-bonding ability is improved. In addition, oscillating energy required for melt-bonding can be decreased to provide a tape cassette which is highly reliable.

In accordance with the present invention, it is possible to carry out melt-bonding and firmly connect both half casings even if the half casings are made of crystalline resin, or regardless of how thick the half casings are. Accurate connection can be obtained, and melt-bonding on a narrow melting bonding area is sufficient to simplify assemblage. The present invention offers practical advantages in that the tape cassette can withstand torsion or drop shock applied thereto, has high melt-bonding strength, can be used in safe without having adverse effect on the property of a recording and reproducing medium, have good appearance, enhance quality, can remarkably improve assemblage and reliability, and can increase the market value.

IN DRAWINGS

Figure 1:
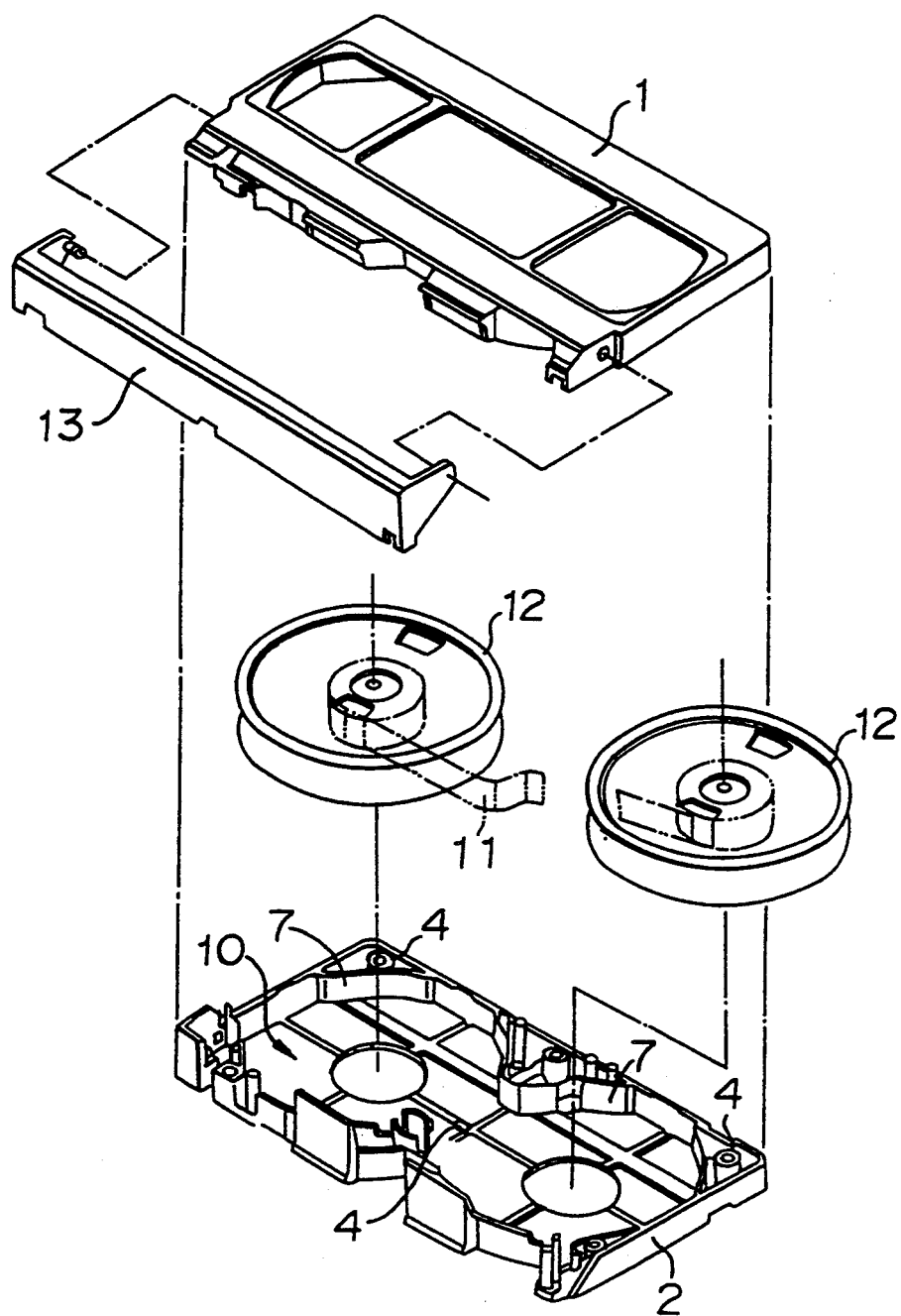
FIG. 1 is a perspective view showing an embodiment of the present invention, wherein parts are shown in spaced apart relation.
Figure 2:
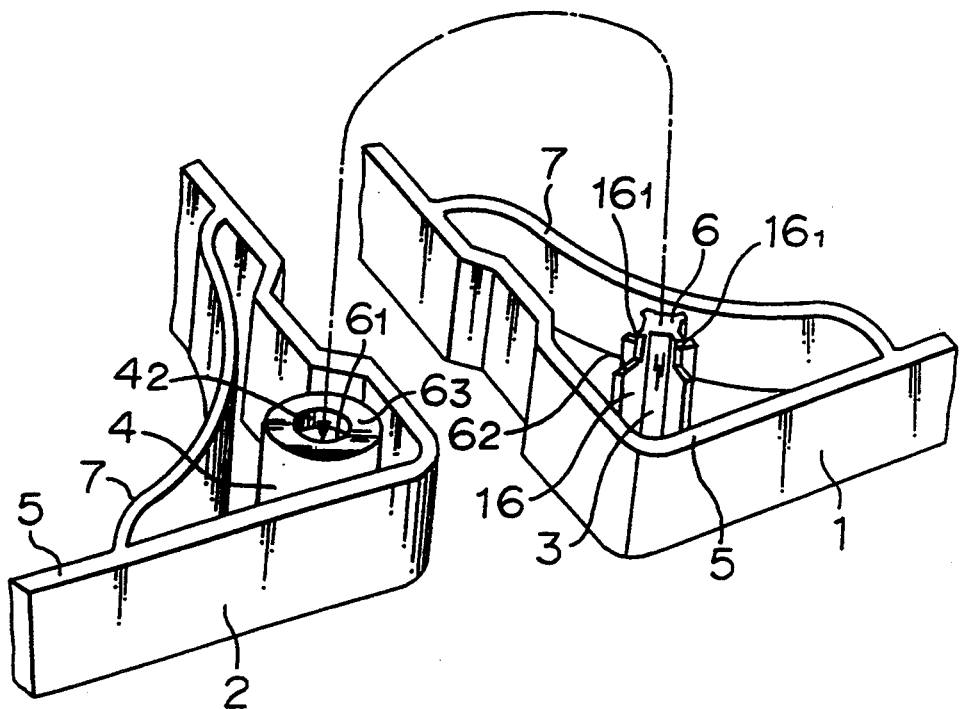
FIG. 2 is an enlarged perspective view showing portions of an upper half casing and a lower half casing, wherein both casings are apart from each other.
Figure 3:
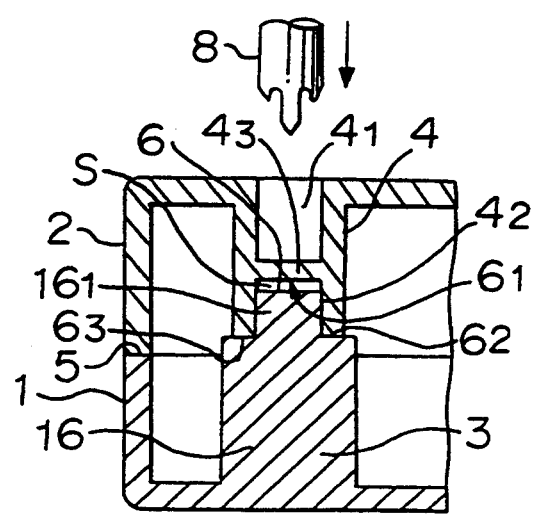
FIG. 3 is a longitudinal sectional view showing the portions shown in FIG. 2 before melt bonding.

Now, the present invention will be described in detail with reference to a preferred embodiment illustrated in FIGS. 1 through 5. A tape cassette is constituted by an upper half casing 1 and a lower half casing 2 which are made of non-crystalline resin such as polystyrene, or crystalline resin such as polypropylene resin, polyethylene resin and polyamide resin. In order to melt-bond both half casings to obtain a structure for housing a tape-like medium, either one of the upper half casing and the lower half casing, e.g. the lower half casing 2, is formed with cylindrical projections 4 which have a hollow recess $4_1$ and a receiving recess $4_2$ formed therein to be apart from each other by a partition wall $4_3$. The other half casing, e.g. the upper half casing 1, has pole-like bosses 3 projected thereon to correspond to the cylindrical projections 4 on the lower half casing, the pole-like bosses having the outer periphery provided with engagement ribs $16_1$ to be inserted into the corresponding receiving recess $4_2$, and supporting ribs 16. The upper end surface of the bosses 3 and the lower end surface of the partition wall $4_3$ of the cylindrical projections 4 are made to be flat to obtain melt-bonding surfaces 6 and $6_1$. A melt-bonding horn 8 is inserted into the hollow recesses $4_1$ of the cylindrical projections 4 to obtain a tape cassette wherein the melt-bonding surfaces 6 and $6_1$ are connected together at spot melt-bonding portions 9 by intermolecular bond.

The pole-like bosses 3 have the outer periphery provided with a plurality of the supporting ribs 16 in radial directions, and the supporting ribs 16 have a leading end portion stepped to obtain an abutting surface $6_2$, and to present the engagement rib $16_1$ on the leading edge. When the engagement rib $16_1$ is inserted into the receiving recess $4_2$ formed in the cylindrical projections 4, a surface $6_3$ of the cylindrical projections 4 for receiving the supporting rib is supported by the abutting surface $6_2$ of the supporting ribs 16 to form a gap S between the melt-bonding surfaces 6 and $6_1$. The gap S works as a pool of a melted portion in carrying out spot melt-bonding. The presence of the gap can prevent a lifting phenomenon from occurring after melt-bonding, and exhibit a shape effective to avoid shrinkage. The engagement ribs $16_1$ can realize positioning with respect to the cylindrical projections 4 to prevent the upper and lower half casings from slipping with respect to each other.

The total area of the abutting surfaces $6_2$ of the supporting ribs 16 is preferable to be equal to or more than the melt bonding area of the melt-bonding surface 6 in terms of ensuring strength and stability in spot-melt-bonding.

The melt-bonding surface 6 has a recess formed thereon by an inserting convex 18 of the melt-bonding horn 8, establishing an integral structure by spot-melt-bonding. The hollow projections 4 have the melt-bonding surface $6_1$ formed therein separately from parting surface 5 of the upper and lower half casings 1 and 2. Such an arrangement is effective because melt-bonding by the horn is easily made, and because time and energy required for melt-bonding can be minimized.

In the embodiment, the cylindrical projections 4 which have the melt bonding surface $6_1$ formed thereon, and the pole-like bosses 3 which have the melt-bonding surface 6 formed thereon to correspond to the melt-bonding surface $6_1$ of the cylindrical projections 4 are obtained by making use of projections which are arranged to be opposite to each other in casing corners which are located between outer side walls of the half casings and partition ribs 7 defining a housing area 10 for a tape 11. As for the location of the cylindrical projections and the pole-like bosses, the four corners in the half casings which are usually selected as tapping positions, or a central portion in the half casings can be selected. This arrangement can give good overall balance and rigidity to cassette halves, and is effectively free from bad appearance due to extrusion of a melted portion after melt-bonding.

In the hollow cylindrical projections 4, the partition wall $4_3$ between the hollow recess $4_1$ and the receiving recess $4_2$ is formed at a lower level than the external surface of the half casing, and the melt-bonding surfaces $6_1$ are located inside the half casing with respect to the casing parting surface 5. In addition, the supporting ribs 16 which are formed on the outer periphery of the bosses 3 to radially project therefrom maintain the gap S between the melt-bonding surfaces 6 and $6_1$ to form a pool for a melted portion during spot melt-bonding, taking easy spot melt-bonding into account.

The casing which is constituted by the upper half casing 1 and the lower half casing 2 has a tape 11 arranged to be wound on a pair of tape reels 12 and 12 rotatably provided in the casing, and has a front lid 13 for opening and closing the casing opening arranged to be swingable, thus obtaining a tape cassette.

In accordance with the embodiment, positioning is effected by putting the engagement ribs $16_1$ of the pole-like bosses 3 into the recess $4_2$ of the hollow cylindrical projections 4, thereby to improve the accuracy and the operating performance of the melt-bonding processes.

Figure 4:
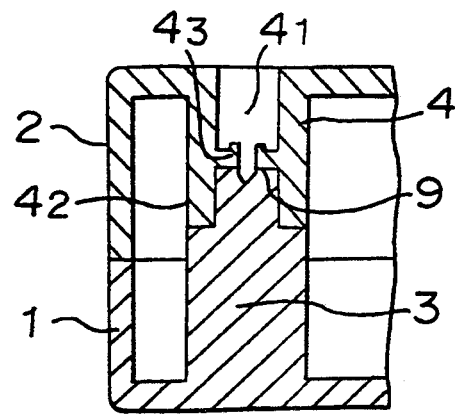
FIG. 4 is a longitudinal sectional view showing the portions shown in FIG. 2 after melt bonding.
Figure 5:
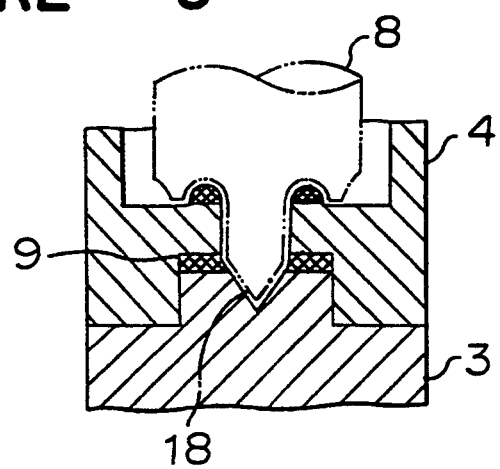
FIG. 5 is an enlarged longitudinal sectional view showing the portions shown in FIG. 4.
Figure 6:
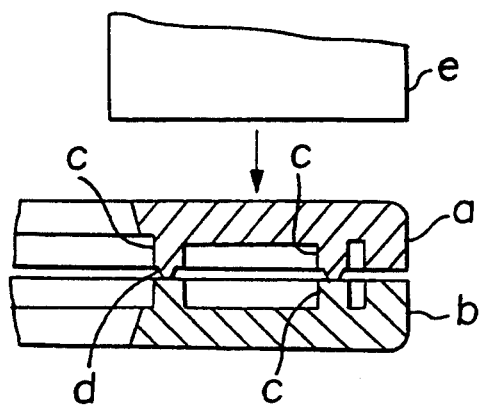
FIG. 6 is a longitudinal sectional view showing portions of connected half casings in a conventional tape cassette.

As shown in FIG. 5 which is an enlarged sectional view of the melt-bonding portions shown in FIG. 4, the melt-bonding surface 6 has a recess formed by the insertion convex 18 of the horn 8 to make intermolecular bond firm.

We claim:

1. A tape cassette comprising:
   a casing for housing a tape medium, which is made of synthetic resin;
   the casing including an upper half casing and a lower half casing, which are connected together at connecting portions as one unit;
   a cylindrical projection which is formed on either one of the upper half casing and the lower half casing, and which has a hollow recess and a receiving recess formed therein to be apart from each other by a partition wall;
   a boss which is formed on the other half casing to project therefrom, and which has an engagement rib and a supporting rib, the engagement rib being adapted to be inserted into the receiving recess of the cylindrical projection, and the supporting rib being adapted to support an abutting surface of the cylindrical projection;
   the supporting rib having an abutting surface formed thereon to receive the abutting surface of the cylindrical projection and to form a gap between melt-bonding surfaces of the cylindrical projection and the boss when the engagement rib of the boss is inserted into the receiving recess of the cylindrical projection during assemblage; and
   both melt-bonding surfaces being spot-melt-bonded as one unit by inserting a melt-bonding horn from the hollow recess, wherein the supporting rib and the engagement rib are formed on an outer periphery of the boss to radially project therefrom.

2. A tape cassette according to claim 1, wherein the total area of the abutting surface of the supporting rib is at least the same as the area of the melt-bonding surface of the boss.

* * * * *